UNITED STATES PATENT OFFICE.

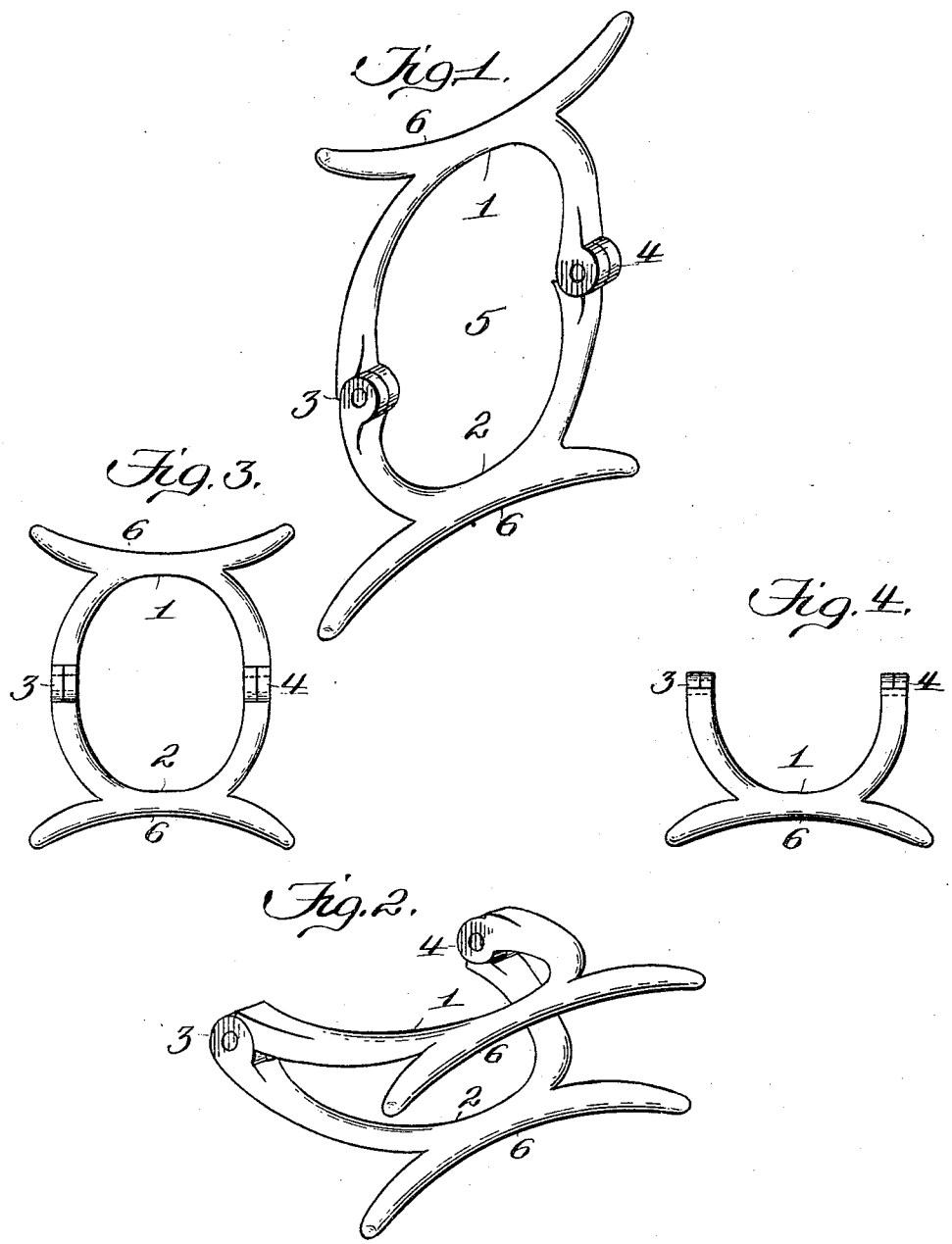

LACHLAN McLEAN, OF BROOKLYN, NEW YORK.

VETERINARY POCKET MOUTH-SPECULUM.

No. 817,659.  Specification of Letters Patent.  Patented April 10, 1906.

Application filed December 1, 1905. Serial No. 289,859.

*To all whom it may concern:*

Be it known that I, LACHLAN MCLEAN, a citizen of the United States, residing at Brooklyn, in the county of Kings and State of New York, have invented new and useful Improvements in Veterinary Pocket Mouth-Speculums, of which the following is a specification.

This invention relates to a veterinary pocket mouth-speculum adapted for use in making microscopic and digital examinations of the mouths and throats of animals and also efficacious in administering medicine in ball form.

The primary object of the invention is to provide a speculum of the class set forth which can be reduced to compact form or folded and carried in the pocket or rendered conveniently portable when not in use and capable of being quickly arranged for positively separating the jaws of animals.

A further object of the invention is to provide a mouth-speculum of simple and comparatively cheap construction wherein the parts are smooth and have such contour as to avoid injury to the mouth to which the speculum is applied.

In the drawings, Figure 1 is a perspective view of a mouth-speculum embodying the features of the invention and shown expanded. Fig. 2 is a perspective view of the speculum shown folded or collapsed. Fig. 3 is a front view. Fig. 4 is a similar view of the device shown closed.

Similar numerals of reference are employed to indicate corresponding parts in the views.

The speculum is composed of two sections 1 and 2, which are approximately of semi-elliptical contour and formed with knuckles 3 and 4 at their inner ends, which are placed in coincidence and pivotally connected to provide hinged joints which are smooth and without injurious projections. The sections 1 and 2 when connected provide a clear central opening 5, through the medium of which various examinations can be made with respect to the mouth and throat of an animal. The curvature of the side members of the sections 1 and 2 is of such nature as to be effective in laterally expanding the walls of the mouth without injuring any part of the latter or painfully annoying the animal to be treated. Each section has an outer rest 6 integrally formed therewith and longitudinally concaved or depressed, the opposite extremities of the rest projecting outwardly beyond the adjacent portions or side members of the sections. The one rest when the speculum is applied contacts with the roof of the mouth and the other with the lower jaw, the longitudinal concaved contour of the rests permitting a bridging of the parts of the mouth with which they engage. When the speculum is applied, the extremities of the rests projecting outwardly beyond the side members of the sections are located close to the side walls of the mouth, and by this means the device will be retained in its applied position and resist the efforts of the animal to dislodge the same.

The speculum when applied is in folded condition, and after it has been inserted within the mouth a sufficient distance the one section is opened with respect to the other and the expansion of the two sections which results by the opening operation forces the jaws apart, holds the tongue down, and provides for unobstructed inspection or examination of the mouth and throat. When the speculum is removed, it is only necessary to collapse the sections thereof.

In addition to the convenience in applying the improved speculum and its portability in compact form the comparative cheapness in construction thereof is the next important feature and which is due to the simplicity of the parts.

Having thus fully described the invention, what is claimed as new is—

1. A speculum of the class set forth involving hinged sections provided with outer longitudinally-concaved rests.

2. A speculum of the class set forth involving hinged sections of approximately elliptical form to provide an unobstructed central opening, the outer portions of the sections having longitudinally-concaved rests.

3. A mouth-speculum of the class set forth involving hinged sections having outer longitudinally-concaved rests with extremities projecting beyond the side members of the sections.

4. In a mouth-speculum of the class set forth, semi-elliptical sections having their inner ends connected by hinge means and also provided with outer longitudinally-concaved rests with extremities projecting outwardly beyond the side members of the sections.

5. A mouth-speculum of the class set forth involving sections hinged at their inner extremities and provided with projections at their outer portions extending beyond the side members of the sections.

In testimony whereof I have hereunto set my hand in presence of two subscribing witnesses.

LACHLAN McLEAN.

Witnesses:
HARRY E. CROWTHER,
ALEX W. McDONALD.